Figure 1:
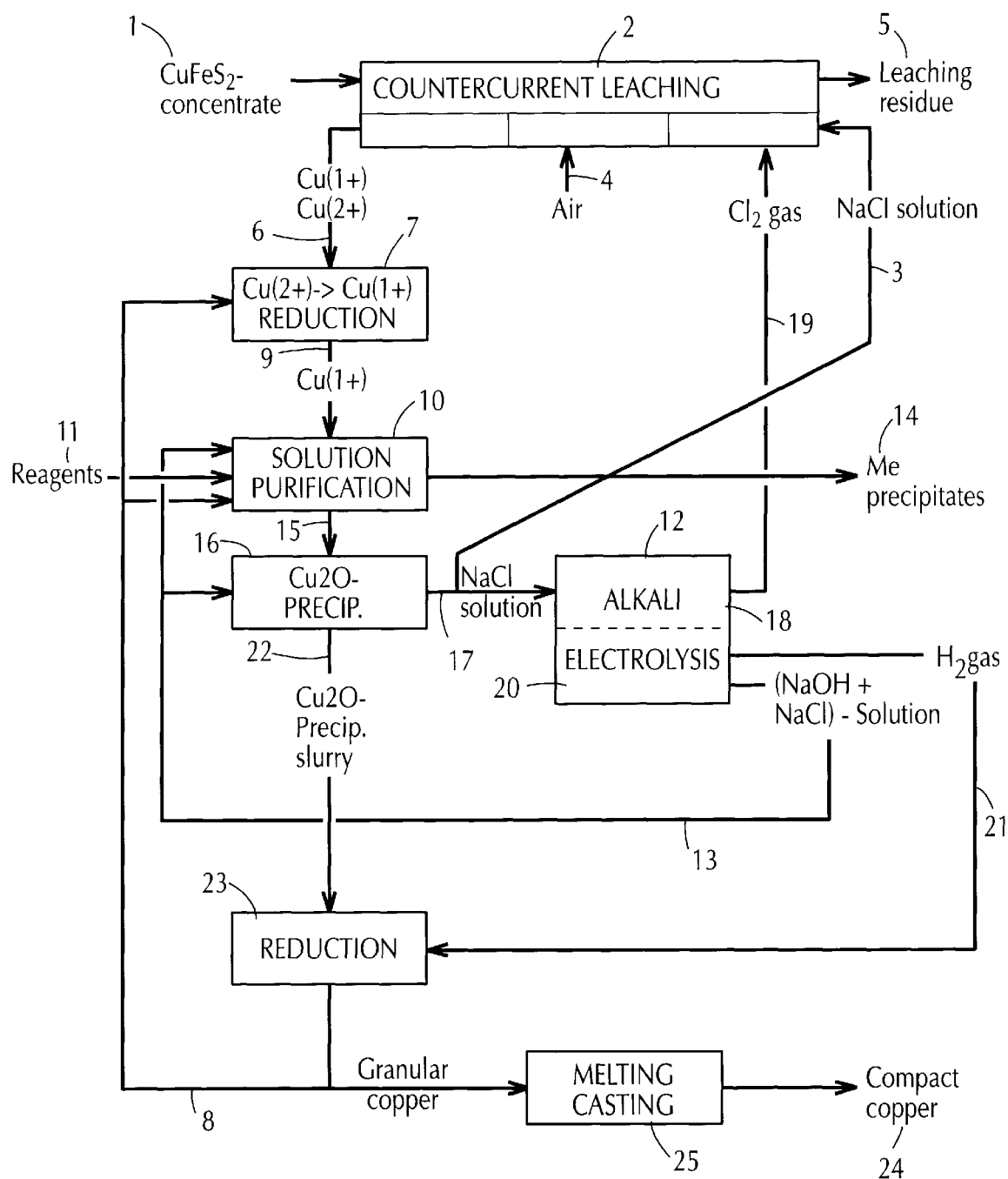

United States Patent
Hyvärinen et al.

[11] Patent Number: 6,007,600
[45] Date of Patent: Dec. 28, 1999

[54] METHOD FOR PRODUCING COPPER IN HYDROMETALLURGICAL PROCESS

[75] Inventors: Olli Hyvärinen; Matti Hämäläinen, both of Pori, Finland

[73] Assignee: Outokumpu OYJ, Finland

[21] Appl. No.: 09/139,831

[22] Filed: Aug. 25, 1998

[30] Foreign Application Priority Data

Aug. 29, 1997 [FI] Finland ................. 973566

[51] Int. Cl.$^6$ .............. C21B 15/00; C01G 3/10; C25B 1/16; C25B 1/34; C25B 1/02
[52] U.S. Cl. .................. 75/740; 75/743; 423/36; 205/510; 205/516; 205/637
[58] Field of Search ............... 75/740, 429, 743; 423/36; 205/512, 510, 516, 637

[56] References Cited

U.S. PATENT DOCUMENTS

| | | |
|---|---|---|
| 507,130 | 10/1893 | Hoepfner . |
| 3,785,944 | 1/1974 | Atwood et al. . |
| 4,025,400 | 5/1977 | Cook et al. . |
| 4,097,271 | 6/1978 | Swinkels et al. . |

*Primary Examiner*—Prince Willis
*Assistant Examiner*—Tima McGuthry-Banks
*Attorney, Agent, or Firm*—Morgan & Finnegan, L.L.P.

[57] ABSTRACT

The invention relates to a method for producing copper in a hydrometallurgical process from copper-bearing raw materials, such as sulfidic concentrates. The concentrate is leached in a leaching stage of several steps into a chloride-based solution. The copper-bearing solution obtained from this leaching is subjected to reduction and solution purification, whereafter the copper contained in the solution is precipitated as copper oxidule by means of alkali hydroxide. The alkali chloride solution formed in the production of copper oxidule is fed into chloride alkali electrolysis, where it is regenerated back into alkali hydroxide. The hydrogen generated in the electrolysis is used in the reduction of copper oxidule and in other reduction stages of the process. The formed chlorine is used in the leaching of the raw material. When necessary, the reduced copper that is in a granular or pulverous form is further subjected to melting and casting in order to produce commercial-grade copper.

16 Claims, 3 Drawing Sheets

METHOD FOR PRODUCING COPPER IN HYDROMETALLURGICAL PROCESS

The present invention relates to a method for producing copper in a hydrometallurgical process from copper-bearing raw materials, such as sulfidic concentrates. The concentrate is leached as a leaching of several steps to a chloride-based solution. The copper-bearing solution obtained from the leaching is subjected to reduction and solution purification, whereafter the copper contained in the solution is precipitated as copper oxidule by means of alkali hydroxide. The alkali chloride solution formed in the production of copper oxidule is fed to chloride-alkali electrolysis, where it is regenerated back to alkali hydroxide. The hydrogen generated in the electrolysis is used for copper oxidule reduction and for other reduction stages in the process. The formed chloride is used for leaching of raw material. When necessary, the reduced granular or pulverous copper product is further subjected to melting and casting in order to produce commercial-grade copper.

Leaching of sulfidic copper material in a chloride environment is known in the prior art and it is economic in that the leaching can be carried out in normal pressure, and that the major part of the copper contained in the solution is made to dissolve in monovalent cuprous form as $Cu^{1+}$, which in principle cuts down energy consumption as compared to the traditional production of electrolytic copper from bivalent $Cu^{2+}$ solution. A typical example of this kind of copper production is the Hoepfner process which was developed already in the 1890'ies and is described in the U.S. Pat. No. 507,130, as well as the CLEAR and INTEC processes; the former is described for example in the U.S. Pat. No. 3,785,944, and the latter for example in the article "Australian company reveals low cost process for granular copper" by J. van Os, Metal Bulletin Monthly, January 1991, p. 67.

In practice the savings in the energy consumption of a cuprous process are, however, reduced by various reasons. Moreover, let us point out the drawback that the metal is created as granular, which is not a normal commercial grade. Owing to this reason and perhaps in order to remove impurities, it may be necessary to melt the granular copper before it is salable, as the experiences from the CLEAR process have shown.

As regards the electrolytic copper process carried out from a $Cu^{1+}$ solution in a chloride environment, there is an additional drawback in that the structure of the electrolytic cells easily becomes too complicated, which is apparent, among others, from the U.S. Pat. No. 4,025,400, also describing the CLEAR process. The complexity of the structure is mainly caused by the granular product which grows onto the cathode surface as needle-like crystals, from where it must be scraped at regular intervals, dropped onto the cell bottom and further removed from there. Also the fact that the cathode and anode spaces of the cell must be separated, either by means of a diaphragm or a membrane, has its effects. This and the needle-like copper grains growing onto the cathode surface result in that the distance left in between the electrodes in order to guarantee a disturbance-free operation (without short circuits!) cannot be very short, which in turn raises energy consumption.

The complexities and shortcomings of the electrolytic stage are pointed out in the U.S. Pat. No. 4,097,271, and the method suggested in said patent is based on the precipitation, carried out by means of gaseous butadiene, of a solid addition compound formed of butadiene and copper (I) chloride from the solution created in the chloride leaching of the sulfide materials. However, the process is very complicated. At first the created addition compound must be decomposed, either by raising temperature or by lowering pressure, in order to recover the butadiene to be reused in the process. In this connection it is also worthwhile to remember that gaseous butadiene creates explosive peroxides when getting into contact with air.

In the method according to the U.S. Pat. No. 4,097,271, the obtained aqueous slurry created by the copper (I) chloride crystals must next be oxidized in an autoclave, where there is created copper (II) oxychloride precipitate and copper (II) chloride solution, which is returned to leaching of sulfide raw material. Thereafter the oxychloride precipitate is converted in normal pressure with sodium hydroxide solution to copper (II) oxide (CuO) according to the following reaction:

$$CuCl_2 \cdot 3Cu(OH)_2 + 2NaOH = 4CuO + 2NaCl + 4H_2O \quad (1)$$

As for the copper (II) oxide, it is reduced in the converter, in facilities located above the copper melting point, by means of hydrogen lancing, into metallic copper, obviously according to reaction (2):

$$CuO + H_2 = Cu + H_2O \quad (2)$$

Thereafter the sodium chloride solution, produced by reaction (1) in the method above, is conducted to chlorine-alkali electrolysis, which produces the sodium hydroxide needed in reaction (1). In addition, the chlorine-alkali electrolysis produces hydrogen gas, which is utilized in the copper (II) oxide reduction according to reaction (2).

In addition to its complexity, the above described method has the drawback that it looses the advantage offered for copper by hydrometallurgical chloride processes: the chance to make use of a lower degree of oxidation. This is illustrated by the following reaction:

$$Cu_2O + H_2 = 2Cu + H_2O \quad (3)$$

Comparison with reaction (2) shows that in reaction (3), a lower degree of oxidation produces a double amount of copper with the same amount of hydrogen.

The object of the invented method is to obviate some of the drawbacks found in the above described methods. The starting-point of the invention is a countercurrent leaching of a sulfidic copper material, such as chalcopyritic copper concentrate, in a chloride milieu, so that the obtained product is an essentially iron-free alkali chloride—copper chloride solution, where the copper is mainly monovalent, i.e. in the form of $Cu^{1+}$, and where the sulfur contained in the raw material is discharged from the process as elementary sulfur. Moreover, the bivalent copper $Cu^{2+}$ of the solution, formed in the counter current leaching, is reduced to monovalent for instance by metallic copper or hydrogen gas prior to conducting the solution into solution purification, where the harmful impurities contained in the solution are removed therefrom.

In the method of the present invention, the electrolytic production of metallic copper, constituting a part in the conventional granular copper method, is replaced by an alkali precipitation of copper oxidule, i.e. $Cu_2O$, from copper (I) chloride—sodium chloride solution after leaching and purifying stages, whereafter the copper oxidule is further reduced to metal. The employed alkali can be sodium or potassium. For the benefit of simplicity, only sodium is referred to in the specification below.

The precipitation of copper oxidule is carried out by sodium hydroxide generated in a chlorine-alkali electrolysis according to the following reaction:

$$2CuCl + 2NaOH = Cu_2O + 2NaCl \quad (4)$$

The use of chlorine-alkali electrolysis instead of copper electrolysis is a characteristic feature of the invention, because the electrolysis regenerates the sodium chloride formed in the $Cu_2O$ precipitation into sodium hydroxide and produces chlorine and hydrogen to be used in the process according to the following sum reaction:

$$2NaCl + 2H_2O = 2NaOH + Cl_2 + 2H_2 \quad (5)$$

The chlorine produced by electrolysis is utilized in the leaching of sulfidic Cu concentrate, and the hydrogen is utilized in the reduction of copper oxidule into metallic copper, either in a furnace or in an autoclave according to reaction (3) above, and possibly also in the reduction of bivalent copper—left in the solution in the leaching process—into monovalent copper. The sodium chloride solution is in circulation and returns either from the oxidule precipitation stage or through electrolysis back to the raw material leaching. The essential features of the invention are apparent from the appended claims.

Figure 2:
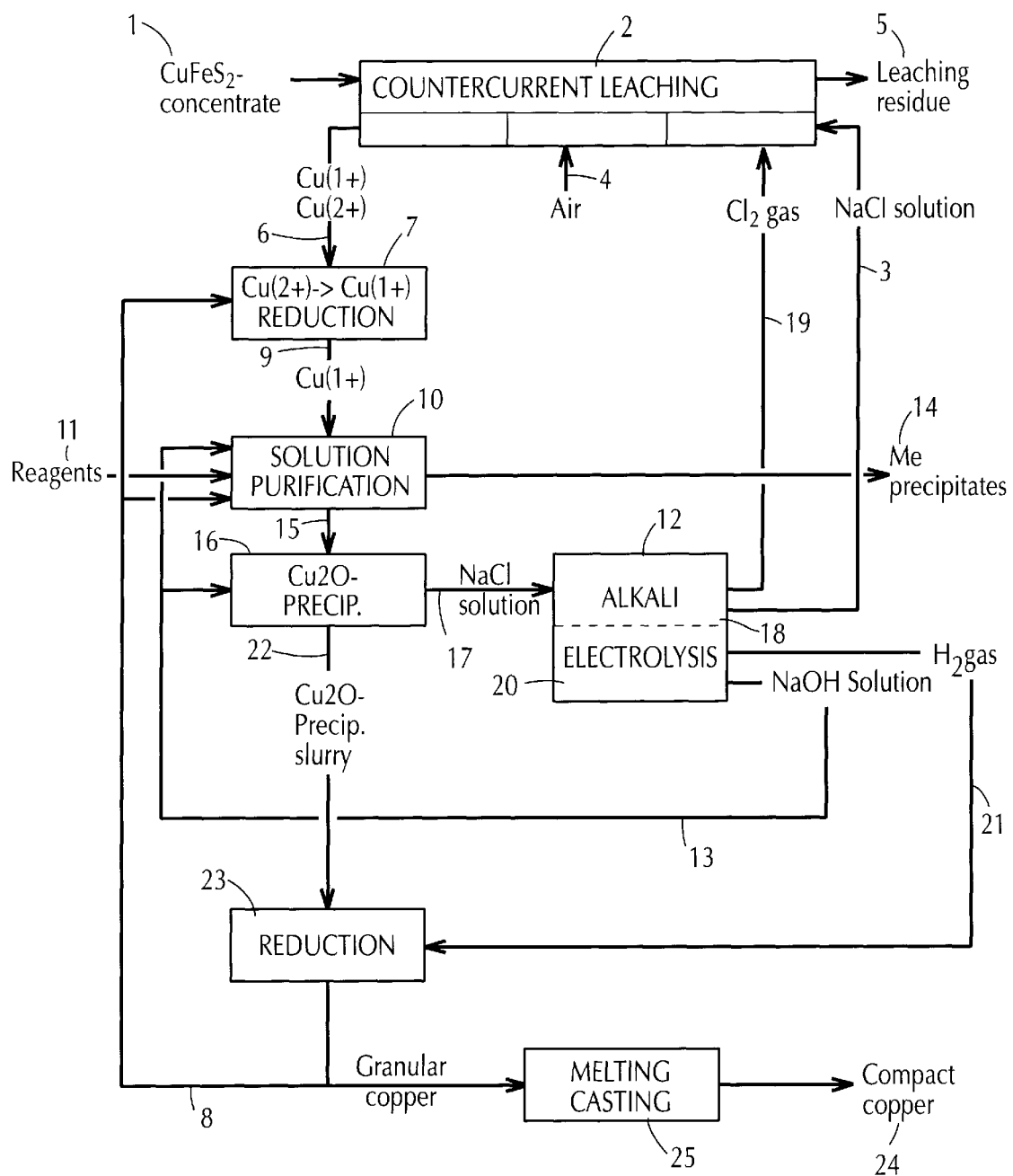
Figure 3:
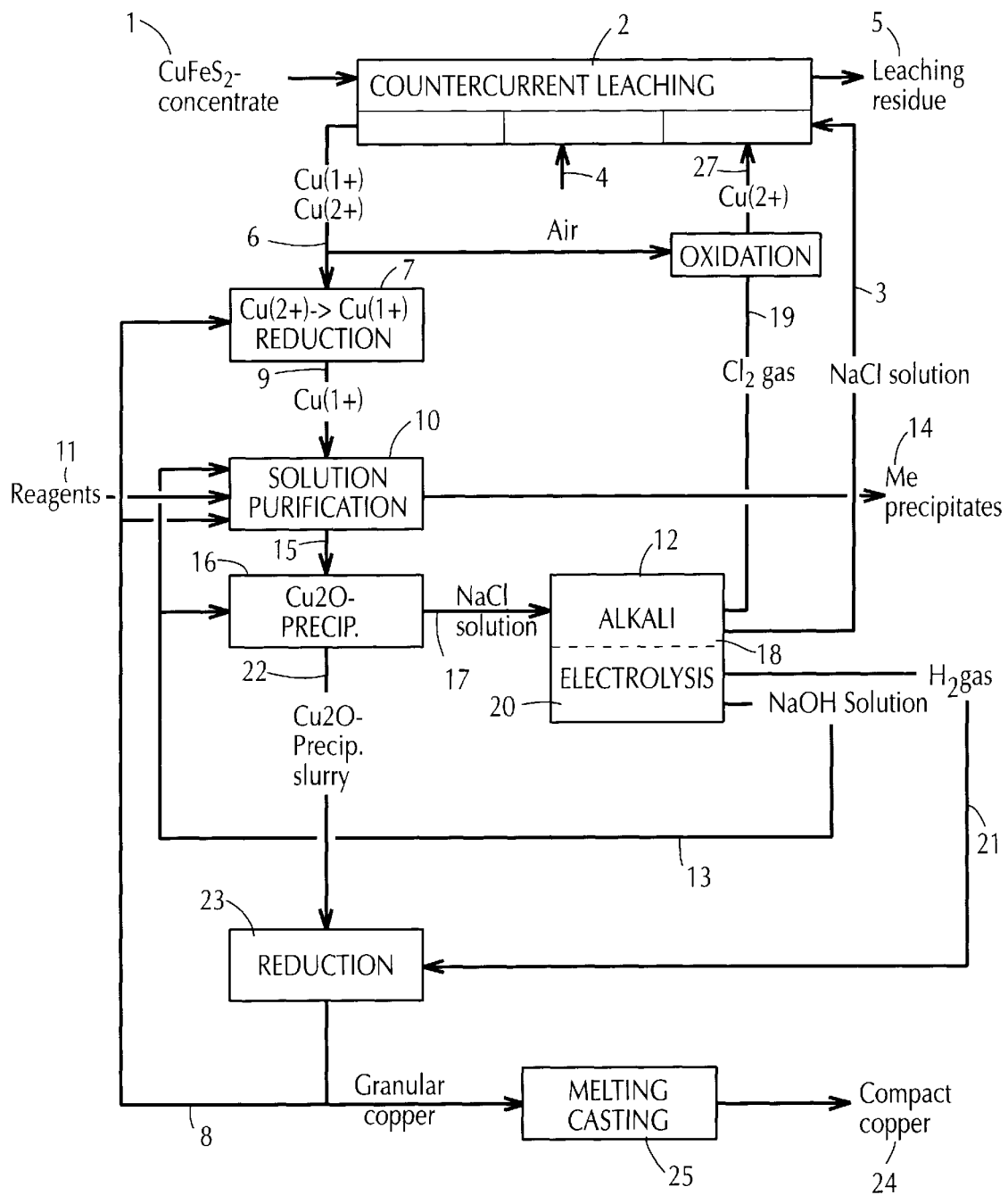

The invention is further described with reference to the appended drawings, where FIG. 1 is a flowchart of a copper manufacturing process according to the present invention, wherein a diaphragm is used in the chlorine-alkali electrolytic cell, FIG. 2 is a flowchart of a similar copper process according to the invention, except that a membrane is used in the alkali electrolytic cell, and FIG. 3 is a flowchart of yet another alternative of the process of the invention.

In a copper manufacturing process according to FIG. 1, leaching of copper raw material, such as copper sulfide concentrate ($CuFeS_2$) 1, is carried out in a counter current leaching 2 of several steps. In this case the leaching is performed into a circulating NaCl solution 3, which can be either copper-free or copper-bearing. Air 4 is conducted to a step being somewhere near the end of the leaching in order to precipitate the iron contained in the raw material. Sulfur is left in the precipitate as elementary sulfur and is separated from the leaching residue 5 containing iron precipitate by known methods, if necessary.

The copper contained in the raw material is dissolved in the counter current leaching, and as a result there is thus obtained an essentially iron-free and more concentrated solution 6 as regards copper, where the copper dissolved from the concentrate is present mainly as monovalent cuprous ions $Cu^{1+}$, but partly also as bivalent $Cu^{2+}$, so that the solution 6 is conducted to reduction 7, the purpose of which is to reduce all bivalent copper into monovalent copper. Advantageously the reduction is carried out by means of the elementary copper 8 obtained from the process. Instead of copper, also hydrogen formed in the process or other suitable reductant can be used.

Thereafter the solution 9 obtained from reduction, in which solution all copper now is present as monovalent, is conducted to solution purification 10, where impurities of the CuCl—NaCl solution are removed by using known reagents 11, and also by means of products obtained from the later stages of the process, i.e. granular copper 8 and sodium hydroxide 13 formed in the chlorine-alkali electrolysis 12. In the solution purification, metallic impurities are precipitated from the copper (I) chloride solution as precipitates 14 at pH values which are lower than the pH values of a solution corresponding to the precipitation of $Cu_2O$.

The pure copper chloride—sodium chloride solution 15 is conducted to copper precipitation phase 16 in order to precipitate the copper from the solution as copper oxidule $Cu_2O$. The precipitation is carried out by means of sodium hydroxide 13 created in the alkali electrolysis 12. It is especially pointed out that copper is precipitated as copper oxidule, which has a lower degree of oxidation than copper (II) oxide CuO, so that the quantity of reductant needed in a latter reduction is half of the quantity needed in the reduction of copper oxide. It has been found out that the $Cu_2O$ precipitation does not necessarily have to be complete, because pure NaCl salt can be crystallized from the CuCl—NaCl solution; said salt can be washed and dissolved, and the obtained solution can be fed either directly to alkali electrolysis or to saline solution cleaning (not illustrated in the drawing) normally preceding said alkali electrolysis.

Part of nearly saturated sodium chloride solution 17 obtained from precipitation 16 is conducted to the chlorine-alkali electrolysis 12, where anode and cathode spaces are in this alternative separated from each other by means of a diaphragm. The rest of the sodium chloride solution is conducted directly back to counter current leaching 2. Via electrolysis, there is circulated such an amount of solution that the created sodium hydroxide suffices for the reactions required in the solution purification and oxidule precipitation. The chlorine gas 19 generated on the anode 18 is used in the counter current leaching for leaching the concentrate. The NaCl—NaOH solution discharged from the cathode 20 is conducted to $Cu_2O$ precipitation and to solution purification.

The method illustrated in FIG. 2 is similar to the one described in FIG. 1, except that instead of the diaphragm, there is used a membrane in between anode and cathode. In practice this means that the sodium chloride solution 17 obtained from copper oxidule precipitation 16 can be completely circulated via alkali electrolysis 12. In that case water is fed to the cathode side. The anolyte, i.e. the sodium chloride solution 3, diluted in the electrolysis, is circulated back to concentrate leaching. The sodium hydroxide 13 created on the cathode 20 is used, as was already described above, in solution purification and in the precipitation of copper oxidule.

As is apparent from FIGS. 1 and 2, on the cathode of alkali electrolysis, there also is generated hydrogen 21, whereby the copper oxidule precipitate 22 obtained from $Cu_2O$ precipitation is in the reduction phase 23 reduced into granular copper 8. If the quantity of generated hydrogen is not sufficient for the whole reduction process, there can be used other additional reductants. In the case of the example, the reduction is carried out in a furnace, at a temperature lower than the copper melting point. This procedure is called dry reduction. Precipitation and reduction are advantageously carried out by means of sodium hydroxide 13 and hydrogen 21 obtained from the chlorine-alkali electrolysis 12, and the chlorine 19 created in the electrolysis is used in the leaching of the concentrate. Reduction can also be completely carried out with other reductive agents, such as natural gas or butane, but most advantageously it is for the major part carried out with the hydrogen generated in the process.

The reduction 23 of copper oxidule crystals in solid state is carried out in a furnace, for example in a shaft or rotary furnace, by means of hydrogen or some other reducing gas. It is pointed out that the reduction of $Cu_2O$ taking place in solid state is an exothermic process, i.e. it does not consume energy. The reduction of $Cu_2O$ crystals can be carried out by means of hydrogen also from $Cu_2O$ aqueous slurry in an autoclave, or at temperatures above the copper melting point, in the presence of metallic copper, and in that case the created elementary copper does not need a separate melting phase.

When the reduction has been carried out in solid state or from slurry, it is sometimes necessary, for obtaining compact commercial-grade copper 24, to perform melting and casting in stage 25 for the granular or pulverous copper 8 created in the reduction. However, it can be maintained that the melting and casting 25, illustrated in the drawings, is only one possibility for treating the copper product 8. Other ways are the use of the copper product as such for powder metallurgical purposes, or extrusion into compact copper.

In the processes according to FIGS. 1 and 2, chlorine gas is conducted into counter current leaching, to the last step when seen in the flowing direction of the concentrate. This does not, however, exclude the possibility to feed chlorine gas also to the preceding step of the counter current leaching stage. However, chlorine gas may as such be too efficient as an oxidizer, which can cause oxydation of sulfur as far as elementary sulfur and/or sulfate. In order to avoid this, in FIG. 3 there is presented an alternative where in the situation of FIG. 2, instead of conducting chlorine gas into leaching, part of the solution 6 coming from counter current leaching is fed, instead of the reduction phase 7, to an oxidizing reactor 26, where the monovalent copper contained in the solution is oxidized with chlorine gas to bivalent, and this solution 27 is conducted to counter current leaching in addition to the NaCl solution.

As is apparent from the drawings illustrating the process solutions according to the present invention, alkali electrolysis has a central role in the method. At least part of the sodium chloride solution coming from the $Cu_2O$ precipitation is conducted to the alkali electrolysis, from which solution there is regenerated in the electrolysis the NaOH needed in the $Cu_2O$ precipitation, as well as the chlorine gas required by the counter current leaching and serving as the oxidizer/leaching agent, and the hydrogen gas required in the reduction processes. When using diaphragm cells, part of the NaCl solution is conducted directly back to concentrate leaching after the $Cu_2O$ precipitation, and when using membrane cells, the whole NaCl solution can be conducted through electrolysis, in which case there is obtained as the anolyte a diluted NaCl solution, which is conducted to concentrate leaching.

In the method according to the present invention, in the copper manufacturing process, the copper (I) chloride electrolysis leading to complicated cell constructions has been replaced by $Cu_2O$ precipitation carried out in ordinary reactors and by chlorine-alkali electrolysis used in the basic chemical industry. This makes the whole process equipment simpler and more secure in operation. For example the space needed by alkali electrolysis can be less than half of the space needed by CuCl electrolysis of a corresponding capacity. The consumption of electric energy with these two types of electrolytic processes is more or less the same per produced kilo of copper. Among the advantages of chlorine-alkali cells, let us point out their high current density and an operation environment free of solid particles, as well as a completely sealed and extremely compact structure that has been tested in practice.

We claim:

1. A method for recovering copper from sulfidic copper raw materials which comprises leaching copper raw material countercurrently with an alkali chloride solution in several steps to obtain an essentially iron-free solution more concentrated in copper, reducing said solution by converting bivalent copper into monovalent copper, purifying said reduced solution containing monovalent copper, reacting said purified reduced solution with an alkali hydroxide to form and precipitate copper oxidule, reducing said copper oxidule to obtain elemental copper, regenerating the alkali chloride solution obtained from the precipitation step by chlorine-alkali electrolysis, circulating alkali hydroxide obtained from the regeneration step to the copper oxidule precipitation step, using hydrogen gas obtained in the electrolysis step for the aforesaid reduction step, and using chlorine gas generated in the reduction step for leaching of the copper raw material.

2. A method according to claim 1, characterized in that the alkali is sodium.

3. A method according to claim 1, characterized in that the alkali is potassium.

4. A method according to claim 1, characterized in that the alkali hydroxide formed in the alkali electrolysis is utilized in solution purification.

5. A method according to claim 1, characterized in that the elementary copper created in the process is utilized in solution purification.

6. A method according to claim 1, characterized in that reduction of copper oxidule is carried out by means of hydrogen formed in the chlorine-alkali electrolysis.

7. A method according to claim 1, characterized in that the reduction of copper oxidule is carried out in solid state.

8. A method according to claim 1, characterized in that the reduction of copper oxidule is carried out as aqueous slurry in an autoclave.

9. A method according to claim 1, characterized in that the reduction of copper oxidule is carried out in the presence of metallic copper, at temperatures above the copper melting point.

10. A method according to claim 1, characterized in that the solution coming from the leaching of copper raw material is subjected to the reduction of bivalent copper into monovalent copper by means of elementary copper created in the process and/or hydrogen generated in the chlorine-alkali electrolysis.

11. A method according to claim 1, characterized in that a diaphragm is used in the chlorine-alkali electrolysis in between anodes and cathodes.

12. A method according to claim 11, characterized in that the leaching of the copper raw material is carried out by means of alkali chloride solution obtained from the $Cu_2O$ precipitation.

13. A method according to claim 1, characterized in that part of the solution obtained from the raw material leaching is conducted to an oxidizing reactor, where the monovalent copper contained in the solution is oxidized by means of chloride gas, and the created solution containing copper (II) chloride is conducted back to the leaching of the raw material.

14. A method according to claim 1, characterized in that the elementary copper product is melted and cast into compact copper.

15. A method according to claim 1, characterized in that the elementary copper product is treated hydrometallurgically.

16. A method according to claim 1, characterized in that the elementary copper product is extruded into compact copper.

* * * * *

UNITED STATES PATENT AND TRADEMARK OFFICE
CERTIFICATE OF CORRECTION

PATENT NO. : 6,007,600
DATED : December 28, 1999
INVENTOR(S) : Olli Hyvärinen; Matti Hämäläinen It is certified that error appears in the above-identified patent and that said Letters Patent is hereby corrected as shown below:

Claim 1,
Line 14, (column 6, line 14), delete "reduction" and insert -- electrolysis --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*